United States Patent
Garvey et al.

(10) Patent No.: US 11,494,487 B2
(45) Date of Patent: Nov. 8, 2022

(54) METHODS AND SYSTEMS FOR SECURE MESSAGE TRANSMISSIONS BETWEEN TRUST DOMAINS

(71) Applicant: THE BOEING COMPANY, Chicago, IL (US)

(72) Inventors: Paul John Garvey, Kent, WA (US); Jeffrey Ricky Shen, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 338 days.

(21) Appl. No.: 16/859,912

(22) Filed: Apr. 27, 2020

(65) Prior Publication Data
US 2021/0334368 A1 Oct. 28, 2021

(51) Int. Cl.
*G06F 21/55* (2013.01)
*G06F 9/455* (2018.01)

(52) U.S. Cl.
CPC ........ *G06F 21/554* (2013.01); *G06F 9/45558* (2013.01); *G06F 2009/45587* (2013.01); *G06F 2221/032* (2013.01)

(58) Field of Classification Search
CPC ............. G06F 21/554; G06F 2221/032; G06F 2009/45587; G06F 9/45558; G06F 9/45; G06F 9/455; H04L 63/20; H04L 63/10; H04L 63/0272
See application file for complete search history.

(56) References Cited

U.S. PATENT DOCUMENTS

| | | | |
|---|---|---|---|
| 7,519,818 B2 | 4/2009 | Levin et al. | |
| 7,739,494 B1 | 6/2010 | McCorkendale et al. | |
| 7,962,259 B2 | 6/2011 | Schafer, Jr. et al. | |
| 8,498,414 B2 | 7/2013 | Rossi | |
| 8,677,489 B2 | 3/2014 | Strebe et al. | |
| 8,953,798 B2 | 2/2015 | Rossi | |
| 9,015,090 B2 | 4/2015 | Chien | |
| 9,088,415 B2 | 7/2015 | Gagliano et al. | |
| 9,572,063 B2 * | 2/2017 | Etemad | H04L 41/0823 |
| 10,863,494 B2 * | 12/2020 | Zhang | H04L 5/005 |
| 2015/0188949 A1 * | 7/2015 | Mahaffey | H04W 12/37 726/1 |

* cited by examiner

*Primary Examiner* — Wei Zhao
(74) *Attorney, Agent, or Firm* — Armstrong Teasdale LLP

(57) ABSTRACT

A computer device for routing communications from a low-trust domain to a high-trust domain is provided. The computer device includes a first processor and a second processor. The first processor is programmed to receive a packet from the low-trust domain to be transmitted to the high-trust domain and compare the source address to a white list of source addresses. If the source address matches the white list, the first processor is programmed to compare the message to one or more messaging requirements. If the message meets the one or more messaging requirements, the first processor is programmed to write the message to a memory. The second processor is programmed to read the message from the memory and compare the message to a plurality of stored values. If the message matches the plurality of stored values, the second processor is programmed to act upon the message.

20 Claims, 6 Drawing Sheets

METHODS AND SYSTEMS FOR SECURE MESSAGE TRANSMISSIONS BETWEEN TRUST DOMAINS

BACKGROUND

The field of the present disclosure relates generally to secure message transmission and, more specifically, to securely transmitting messages between a low-trust domain and a high-trust domain using memory mapping techniques.

Any connected open system may present a security threat to a secure system. For example, many aircraft include flight entertainment systems, which allow passengers to access the aircraft's Wi-Fi to provide entertainment material, such as videos and music. However, some cybersecurity threats may use this access to infiltrate other connected systems. Therefore it is vitally important that systems with open access, such as that for passengers, be protected from cybersecurity threats. And any systems that connect to those open access systems should be protected from infiltration through those open access systems. Many known protection systems introduce delays in the speed of message traffic as a means for protection, as the systems have to analyze data as it passes through. Accordingly, a system that improves the security between open access systems and other systems without increasing latency is desirable.

BRIEF DESCRIPTION

In one aspect, a computer device for routing communications from a low-trust domain to a high-trust domain is provided. The computer device includes at least a first processor and a second processor. The first processor is programmed to receive a packet from the low-trust domain to be transmitted to the high-trust domain. The packet includes a message and a source address. The first processor is also programmed to compare the source address to a list of known acceptable source addresses. If the source address matches the white list, the first processor is further programmed to compare the message to one or more messaging requirements. If the message meets the one or more messaging requirements, the first processor is also programmed to write the message to a memory. The second processor is programmed to read the message from the memory. The second processor is also programmed to compare the message to a plurality of stored values. If the message matches the plurality of stored values, the second processor is programmed to act upon the message.

In another aspect, a method for routing communications from a low-trust domain to a high-trust domain is provided. The method is implemented by a first processor and a second processor. The method includes receiving a packet from the low-trust domain to be transmitted to the high-trust domain. The packet includes a message and a source address. The method further includes comparing, by the first processor, the source address to a white list of source addresses. If the source address matches the white list, the method includes comparing, by the first processor, the message to one or more messaging requirements. If the message meets the one or more messaging requirements, the method writing, by the first processor, the message to a memory. The method includes reading, by the second processor, the message from the memory. The method also includes comparing, by the second processor, the message to a plurality of stored values. If the message matches the plurality of stored values, the method further includes acting, by the second processor, upon the message.

In a further aspect, a system for routing communications from a low-trust domain to a high-trust domain is provided. The system includes a plurality of computer devices associated with a low-trust domain, at least one computer device associated with a high-trust domain, and a domain guard computer device. The domain guard computer device includes a first processor, a second processor, and at least one memory device. The domain guard computer device is in communication with the plurality of computer devices associated with the low-trust domain and the at least one computer device associated with the high-trust domain. The domain guard computer device is programmed to receive a packet from a computer device of the plurality of computer devices associated with the low-trust domain to be transmitted to the at least one computer device associated with the high-trust domain. The packet includes a message and a source address. The domain guard computer device is also programmed to compare, by the first processor, the source address to a white list of source addresses. The white list of source addresses includes the plurality of computer devices associated with the low-trust domain. If the source address matches the white list, the domain guard computer device is programmed to compare, by the first processor, the message to one or more stored messaging requirements. If the message meets the one or more stored messaging requirements, domain guard computer device is also programmed to write, by the first processor, the message to a memory. The domain guard computer device is further programmed to read, by the second processor, the message from the memory. In addition, the domain guard computer device is programmed to compare, by the second processor the message to a plurality of stored values. If the message matches the plurality of stored values, the domain guard computer device is programmed to act, by the second processor, upon the message.

DETAILED DESCRIPTION

Figure 1:
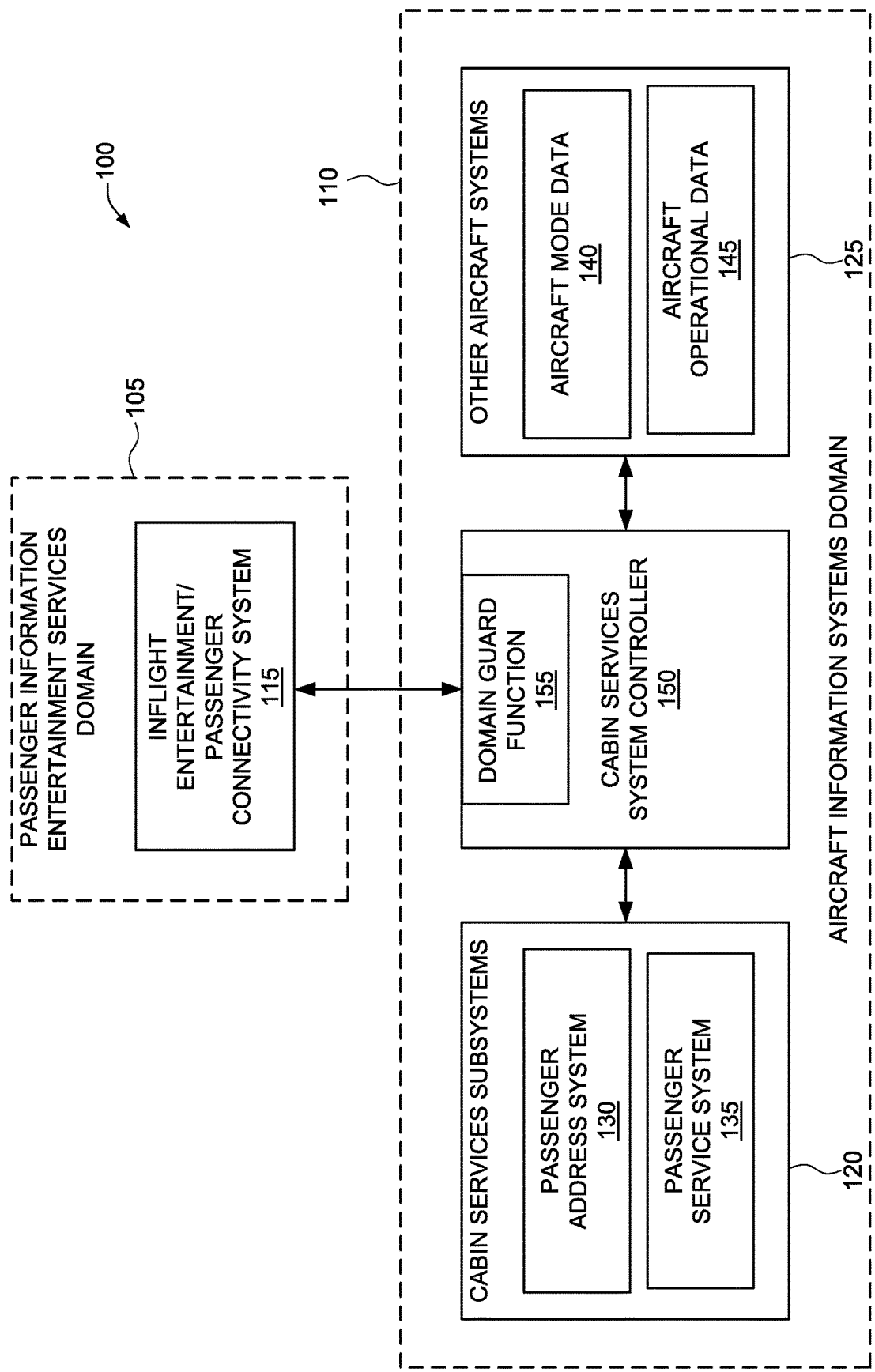
FIG. 1 illustrates a block diagram of a system for operating cabin services on an aircraft in accordance with at least one embodiment.

The implementations described herein relate to systems and methods for securing communications between computer systems of a low-trust domain and computer systems of a high-trust domain using memory mapping techniques. In particular, a domain guard controller includes a low-trust domain processor and a high-trust domain processor. The domain guard controller receives a message in a packet from a low-trust domain computer device to be transmitted to a high-trust domain computer device. The low-trust domain processor determines if the packet is from an allowed address. If so, then the low-trust domain processor retrieves the message from the packet and determines if it is a valid message. If so, then the low-trust domain processor writes the message to a memory location on the low-trust domain side of the domain guard controller. The high-trust domain processor reads the message and then determines if it is a valid message for the high-trust domain. If so, then the high-trust domain processor generates a packet based on the message and transmits the packet to its destination.

Described herein are computer systems such as the domain guard computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "cybersecurity threat" includes an unauthorized attempt to gain access to a subject system. Cybersecurity threats, also known as cyber-attacks or cyber-threats, attempt to breach computer systems by taking advantage of vulnerabilities in the computer systems. Some cybersecurity threats include attempts to damage or disrupt a subject system. These cybersecurity threats may include, but are not limited to, active intrusions, spyware, malware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing a computing device, remotely via a communications network or connected system, or through an associated supply chain.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

FIG. 1 illustrates a block diagram of a cabin services system 100 for an aircraft in accordance with at least one embodiment. While system 100 is designed for an aircraft, one having skill in the art would understand that system 100 may be used in other situations, such as, but not limited to, motor coaches and buses, water craft (e.g., cruise ships), office waiting rooms, personal automobiles, and any other location that wishes to provide information and limited access to guests on the Wi-Fi or network.

In the example embodiment, the cabin services system 100 is an isolated system that is separate from the systems that operate the aircraft. In some embodiments, there may be multiple other systems or networks that are associated with the aircraft, but are completely disconnected from the cabin services system 100. In the example embodiment, the cabin services system 100 includes interfaces for a plurality of passengers to access inflight entertainment and connectivity options.

In the example embodiment, the cabin services system 100 is made up of two domains, a passenger information entertainment services domain 105 and an aircraft information systems domain 110. The passenger information entertainment services domain 105 is the low-trust domain. This is the domain that the passengers and their devices may directly access and includes the inflight entertainment/passenger connectivity system 115. In the example embodiments, the inflight entertainment/passenger connectivity system 115 provides entertainment options to the passengers, such as through the seatback entertainment devices. In some embodiments, the inflight entertainment/passenger connectivity system 115 provides Wi-Fi access to connect passenger devices to the inflight entertainment/passenger connectivity system 115. In still further embodiments, the inflight entertainment/passenger connectivity system 115 provides Internet access to the passengers, either through the Wi-Fi or through wired connections to the seatback entertainment devices. In some embodiments, the passenger information entertainment services domain 105 includes crew access points, such as those accessible by flight attendants to make public announcements.

The aircraft information systems domain 110 is the higher trust domain. This domain is the one that includes information provided by the aircraft, such as cabin services subsystems 120 and other aircraft systems 125. The cabin services subsystems 120 include a passenger address system 130 and a passenger service system 135. The other aircraft systems 125 include aircraft mode data 140 and aircraft operational data 145. The communication between the aircraft information systems domain 110 and the passenger information entertainment services domain 105 is controlled by a cabin services system controller 150 which executes a domain guard function 155. The domain guard function 155 and the cabin services system controller 150 serve as a gateway and router, respectively, for communications to and from the passenger information entertainment services domain 105 as described herein. In some embodiments, the aircraft information systems domain 110 is isolated from any systems or networks that control the aircraft.

Figure 2:
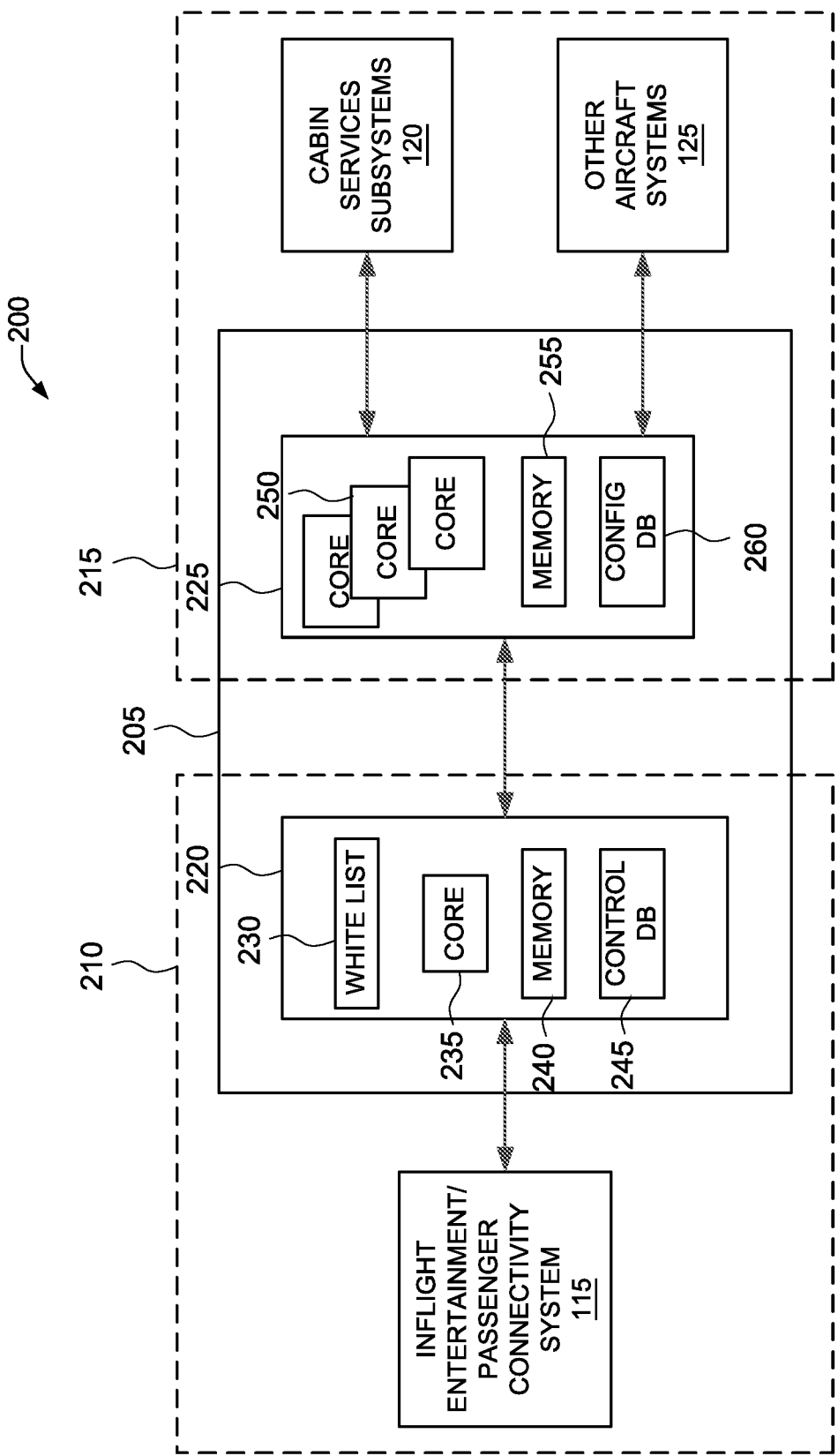
FIG. 2 illustrates an example system architecture for protecting systems such as the system shown in FIG. 1.

FIG. 2 illustrates an example system architecture 200 for protecting systems such as the cabin services system 100 (shown in FIG. 1). In the example embodiment, a domain guard controller 205 acts as an intermediary between a low-trust domain 210 and a high-trust domain 215. In the example embodiment, the low-trust domain 210 is similar to the passenger information entertainment services domain 105 (shown in FIG. 1). The high-trust domain 215 is similar to the aircraft information systems domain 110 (shown in FIG. 1). The domain guard controller 205 is similar to the cabin services system controller 150 (shown in FIG. 1). The connections between the domains need to be controlled to ensure that functions in the low-trust domain 210 do not adversely impact functions in the high-trust domain 215. The domain guard controller 205 is configured to securely and efficiently pass messages from the low-trust domain 210 to the high-trust domain 215. In the example embodiment, the domain guard controller 205 executes at least two hypervisors, a first hypervisor 220 for the low-trust domain 210 and a second hypervisor 225 for the high-trust domain 215.

The first hypervisor 220 includes a white list 230, one or more virtual processing cores 235, one or more virtual memory devices 240, and at least one control database 245. In the example embodiment, the white list 230 contains a list of IP addresses and ports that are allowed to communicate from the low-trust domain 210 to the high-trust domain 215. In the aircraft embodiment, the white list 230 may contain a listing of all of the passenger entertainment seatback devices on the aircraft as well as any other IP addresses/Port combinations used by the inflight entertainment/passenger connectivity system 115. The white list 230 may also include information about one or more Wi-Fi routers that allow passengers to connect with their personal computing devices. In the example embodiment, the memory 240 is read only from the point of view of the second hypervisor 225. The control database 245 includes information about the types, formats, and data value ranges for messages that the domain guard controller 205 may pass from the low-trust domain 210 to the high-trust domain 215.

In the example embodiment, the domain guard controller 205 has a direct wired connection to a plurality of computing devices associated with the low-trust domain 210, such as inflight entertainment/passenger connectivity system 115. This wired connection may be to the individual passenger entertainment seatback devices or to a router that connects to the passenger entertainment seatback devices and the domain guard controller 205. In the case of Wi-Fi connections for the passengers, the domain guard controller 205 may have a direct wired connection to the Wi-Fi router. In at least one embodiment, the domain guard controller 205 has a single point-to-point 100BaseT Ethernet LAN connection with the head-end equipment for the inflight entertainment/passenger connectivity system 115. By having the single point-to-point connection, the opportunity to improperly use legitimate messages or to insert malformed ones without going through the inflight entertainment/passenger connectivity system 115 is significantly reduced.

The second hypervisor 225 includes a plurality of processing cores 250, at least one memory 255, and a configuration database 260. In the example embodiment, each processing core 250 is dedicated to a different connection. For example, one processing core 250 is dedicated to the connection between the first hypervisor 220 and the second hypervisor 225. Another processing core 250 is dedicated to a first set of subsystems in the high-trust domain 215, such as the cabin services subsystems 120. A further processing core 250 is dedicated to a second set of subsystems in the high-trust domain 215, such as other aircraft systems 125. Each of the processing cores 250 is separate to prevent data leakage between the processing cores 250. The configuration database 260 includes information about the messages expected to be received from the low-trust domain 210. In the example embodiment, the processing core(s) 235 on the low-trust domain 210 are completely separate from the processing core(s) 250 of the high-trust domain 215, both in time and in space, to establish domain and layered security.

In some embodiments, the domain guard controller 205 includes multiple processing cores 235 in the first hypervisor 220. In some of these embodiments, each processing core 235 is dedicated to processing a different type of message or messages from different locations. For example, messages associated with audio and video viewing may be handled by a first processing core 235 and other messages may be handled by the second processing core 235. The different locations may include different subsets of rows and class of the seats or devices. For example, first class may have different entertainment seatback devices than those in economy. Thus those two types of devices may have additional or different messages. Furthermore, the domain guard controller 205 may execute multiple first hypervisors 220 on the low-trust domain 210 to handle different message types and/or messages originating from different parts of the aircraft.

In at least one embodiment, if the domain guard controller 205 senses an attack that it fails to secure, the domain guard controller 205 will limit and potentially stop communication from the low-trust domain 210 to the high-trust domain 215. For example, if the domain guard controller 205 is overwhelmed by traffic from the low-trust domain 210 as a part of a denial of service attack, the domain guard controller 205 will initially throttle the rate at which the messages from the low-trust domain 210 are received. If the attack persists, then the domain guard controller 205 disables the interface to the low-trust domain 210. In some embodiments, this may be reset, such as through a maintenance action or other restart or reset action.

In at least one embodiment, messages are automatically passed from the high-trust domain 215 to the low-trust domain 210. In other embodiments, messages are analyzed as they are passed from the high-trust domain 215 to the low-trust domain 210.

While the disclosure is discussed in an aircraft environment, one having skill in the art would understand that the systems and methods described herein may be used in any environment where messages are passing from a low-trust domain to a higher trust domain.

While FIG. 2 only displays two domains (210 and 215), the domain guard controller 205 may be configured to interface between any number of different trust level domains. For example, the domain guard controller 205 may route and secure communications from a single low-trust domain 210 to two different high-trust domains 215 or from multiple low-trust domains 210 to one or more high-trust domains 215.

In some embodiments, the domain guard controller 205 includes a plurality of physical computer devices, such as first computer device 220 associated with the low-trust domain 210 and second computer device 225 associated with the high-trust domain 215, instead of hypervisors. The first computer device 220 includes a dedicated, physical processor 235 and memory 240. The second computer device 225 includes a plurality of dedicated, physical processors 250 and memory 255. In these embodiments, there is a physical link, such as a bus between the first computer device 220 and the second computer device 225.

Figure 3:
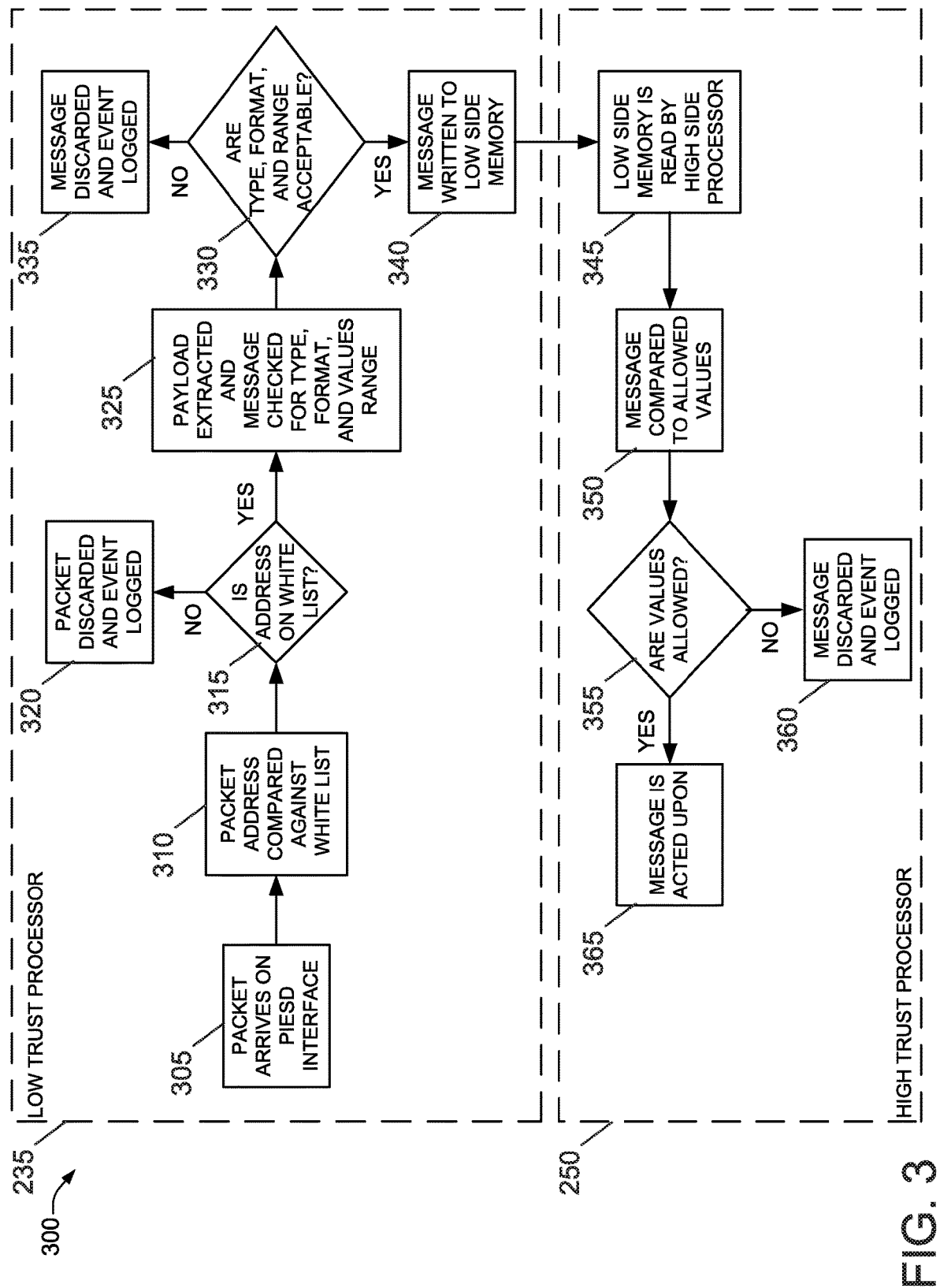
FIG. 3 illustrates a process for using the system architecture shown in FIG. 2.

FIG. 3 illustrates a process 300 for using the system architecture 200 (shown in FIG. 2). In the example embodiment, process 300 is performed by one of the domain guard controller 205 (shown in FIG. 2) and the cabin services system controller 150 (shown in FIG. 1). In the example embodiment, steps 305 through 340 are performed by the processor 235 of the first hypervisor 220, which is associated with the low-trust domain 210 (all shown in FIG. 2). For this discussion, processor 235 will be called the low-trust domain processor 235. Steps 345 through 365 are performed by the second hypervisor 225, which is associated with the high-trust domain 215 (all shown in FIG. 2). For this discussion, processor 250 will be called the high-trust domain processor 250.

The first hypervisor 220 receives 305 a packet on the interface from an inflight entertainment/passenger connectivity system 115 in the low-trust domain 210. The packet is automatically routed to the first hypervisor 220 as the first hypervisor 220 acts as a gateway. The low-trust domain processor 235 compares 310 the source packet address with the white list 230 (shown in FIG. 2). In the example embodiment, the source packet address includes at least the IP address and port that the packet was transmitted from. The low-trust domain processor 235 determines 315 if the address is on the white list 230. If the address is not on the white list 230, the low-trust domain processor 235 discards 320 the packet and logs the event. In the example embodiment, the white list 230 includes each allowed IP address and corresponding port that communication is allowed on. If the IP address and the port do not exactly match the white list 230, then the packet is discarded 320. In some embodiments, a range of addresses are included in the white list 230, such as through an IP address mask.

If the address is on the white list 230, the low-trust domain processor 235 extracts 325 the payload from the packet. In the example embodiment, the message is retrieved and the other parts of the packet are discarded to prevent a potential infiltration by a compromised packet. The message is reconstructed by the low-trust domain processor 235 and then checked 325 for message type, format, and values range. In the example embodiment, the low-trust domain processor 235 checks 325 the message against information in the control database 245 (shown in FIG. 2). The control database 245 stores acceptable message types, formats, and ranges of values. By removing the payload and reconstructing the message from the payload, the individual packets are prevented from traversing the interface from the low-trust domain 210 to the high-trust domain 215. The low-trust domain processor 235 determines 330 if the message is acceptable. If the message is not acceptable, the low-trust domain processor 235 discards 335 the message and logs the event. If the message is acceptable, the low-trust domain processor 235 writes 340 the message to the memory 240 (shown in FIG. 2) in the first hypervisor 220. The memory 240 where the message is written is read-only from the point of view of the second hypervisor 225 and its high-trust domain processors 250.

The high-trust domain processor 250 reads 345 the low-trust domain memory 240 to retrieve the message or message parts. In the example embodiment, the high-trust domain processor 250 monitors the low-trust domain memory 240 for new messages. In some embodiments, the low-trust domain processor 235 has a pointer to where the next message is to be written. The high-trust domain processor 250 has a pointer to the last read message. When the pointers differ, the high-trust domain processor 250 knows there is a new message. In another embodiment, the low trust processor 235 increments a counter whenever a message is written 340 and awaiting processing. The high trust processor 250 would decrement the counter when a message has been processed. When the counter is greater than 0, the high trust processor 250 reads 345 the next message in the queue. In a further embodiment, there are separate high-trust and low-trust counters that are each incremented with each message read 345 and written 340, respectively. When the high-trust counter is less than the low-trust counter, the high-trust domain processor 235 has a message to process.

The high-trust domain processor 250 compares 350 the message to allowed values stored in the configuration database 260 (shown in FIG. 2). The configuration database 260 includes information about the allowed message type and the specific aircraft that the domain guard controller 205 is protecting. The high-trust domain processor 250 determines 355 if the specific values in the message are allowed. If the specific values are not allowed, the high-trust domain processor 250 discards 360 the message and logs the event. If the specific values are allowed, the high-trust domain processor 250 acts 365 upon the message. For example, the high-trust domain processor 250 may reconstruct the message into a packet and route the packet to the appropriate destination in the high-trust domain 215, such as the cabin services subsystems 120 and the other aircraft systems 125.

In the aircraft embodiment, examples of messages that may be transmitting from the low-trust domain 210 to the high-trust domain 215 include, but are not limited to, digital audio messages and command and control messages. Digital audio may include video soundtracks for public announcement broadcasts, pre-recorded audio for public announcement broadcasts, background music, and boarding music. Command and control messages may include, but are not limited to, digital discrete interfaces, passenger/seat information (e.g., commands for passenger reading and call lights), and ACK and NACK messages in response to messages sent from the high-trust domain 215. For example, the message may be a request from a passenger to dim their reading light or window tinting.

In the aircraft embodiment, the domain guard controller 205 uses existing aircraft logging capabilities. When the domain guard controller 205 detects an event that is required to be logged, the domain guard controller 205 sends the event to a central aircraft security log. In other embodiments, the domain guard controller 205 has access to other event logging systems for storing events for later review. In still further embodiments, the events are analyzed by another computing device to determine if the aircraft is under attack from a cybersecurity threat. In another embodiment, the log is maintained locally by the domain guard controller 205, such as in an attached database.

In some embodiments, the low-trust domain processor 235 deconstructs the message into its component parts. Then the information of the message is written 340 as individual pieces to the low-trust domain memory 240. In some further embodiments, only specific portions of the message are written 340 to the low-trust domain memory 240. The high-trust domain processor 250 reconstructs the message based on the information in the low-trust domain memory 240.

In some further embodiments, the low-trust domain memory 240 has specific locations that are tied to different parts of a message. For example, the destination address for a message may always be placed at a specific location in the memory 240. The low-trust domain memory 240 may have dedicated locations for specific types of messages and for specific numbers of messages. For example, the low-trust domain memory 240 may include space for three messages, which then would act as a queue. The low-trust domain processor 235 would write to the three places in order, and the high-trust domain processor 250 would read 345 from each in order. This allows for a faster transfer of messages, while one message is being written 340 by the low-trust domain processor 235, a different message is being read 345 by a high-trust domain processor 250. In some embodiments, the message is unpacked from the IP packet it is received in. The message is written 340 to the low-trust domain memory 240. If the message doesn't fit the precise definitions of what the message is allowed to be, it is rejected and discarded 335. This is in contrast to a firewall that might only look at the IP packet headers and not analyze the specifics to the contents of the message. In some further embodiments, the low-trust domain memory 240 is configured as a FIFO (first in first out) queue with the header of each message identifying the message type.

In some embodiments, different message types may have different methods for passing through the domain guard. For example, audio messages may be sent to a different IP address TCP Port pair. In some other embodiments, audio messages may have their own dedicated memory space for messages. In some further embodiments, audio messages may be send to a different hypervisor 220.

One having skill in the art would understand that process 300 may be performed wherever there is communication between a low-trust domain 210 and a high-trust domain 215. Accordingly, process 300 may be performed between computer systems in other vehicles, in waiting rooms, in hotels, and in any other system where the security of some parts of the system is important and the expected messages are known.

Figure 4:
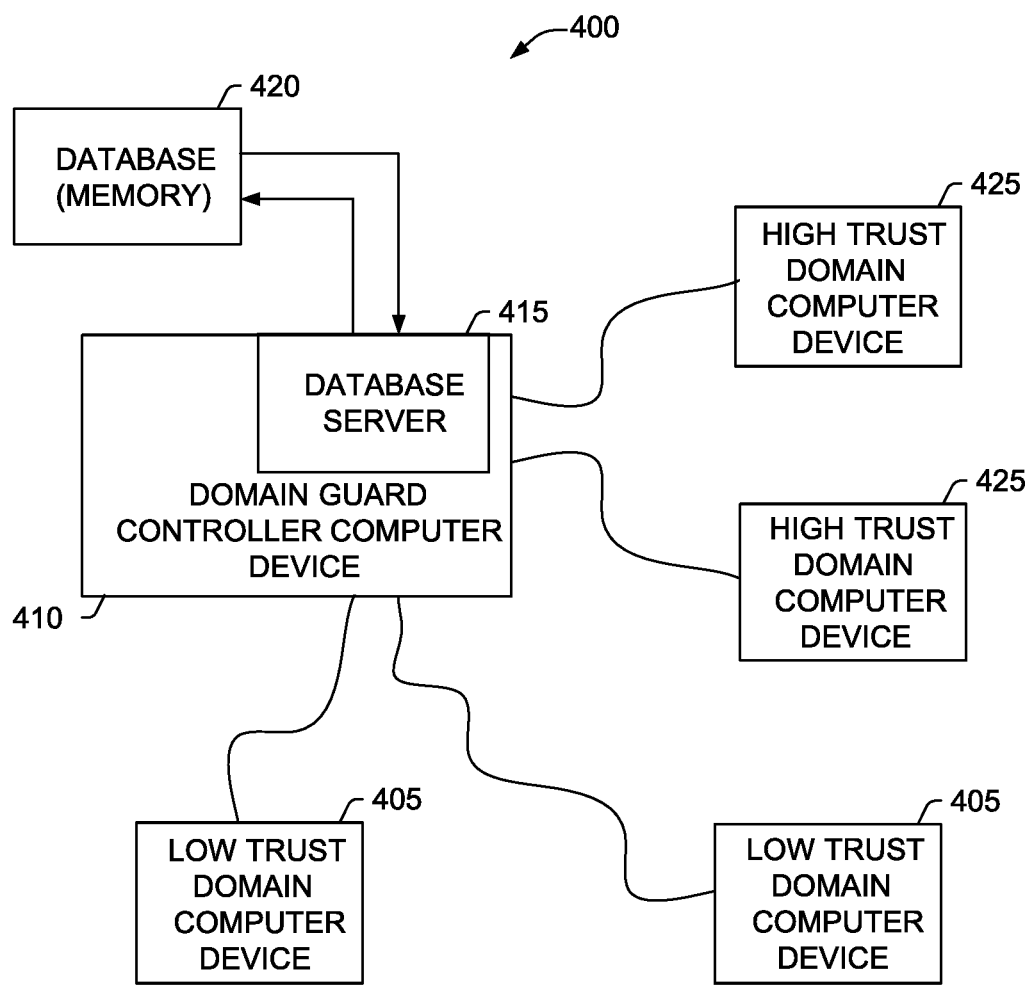
FIG. 4 is a simplified block diagram of an example system for executing the process shown in FIG. 3.

FIG. 4 is a simplified block diagram of an example system 400 for executing the process 300 (shown in FIG. 3). In the example embodiment, the system 400 is used for interfacing between at least one low-trust domain (passenger information/entertainment services domain 105) (shown in FIG. 1) and at least one high-trust domain (aircraft information systems domain 110) (shown in FIG. 1). The system 400 is a domain guard computer system that includes a domain guard controller computer device 410 (also known as a domain guard server) configured to securely transmit images from the low-trust domain 105 to the high-trust domain 110. In some embodiments, the domain guard controller computer device 410 is similar to cabin services system controller 150 (shown in FIG. 1) and domain guard controller 205 (shown in FIG. 2).

In the example embodiment, low-trust domain computer devices 405 are computer devices in a low-trust domain 105. In at least one embodiment, the low-trust domain computer devices 405 are similar to inflight entertainment/passenger connectivity system 115 (shown in FIG. 1). In the example embodiment, low-trust domain computer devices 405 are computers that include a web browser or a software application, which enables low-trust domain computer devices 405 to communicate with domain guard controller computer device 410 using the Internet, a local area network (LAN), or a wide area network (WAN). In some embodiments, the low-trust domain computer devices 405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Low-trust domain computer devices 405 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one embodiment, one or more low-trust domain computer devices 405 are seatback entertainment devices on a vehicle, such as an aircraft.

In the example embodiment, high-trust domain computer devices 425 are computer devices in a high-trust domain 110. In at least one embodiment, the high-trust domain computer devices 425 are similar to cabin services subsystems 120 and other aircraft systems 125 (both shown in FIG. 1). In the example embodiment, high-trust domain computer devices 425 are computers that include a web browser or a software application, which enables high-trust domain computer devices 425 to communicate with domain guard controller computer device 410 using the Internet, a local area network (LAN), or a wide area network (WAN). In some embodiments, the high-trust domain computer devices 425 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. High-trust domain computer devices 425 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one embodiment, one or more high-trust domain computer devices 425 are systems associated with cabin services in a vehicle, such as an aircraft.

A database server 415 is communicatively coupled to a database 420 that stores data. In one embodiment, the database 420 is a database that includes a plurality of potential message settings, such as, but not limited to, control database 245 and configuration database 260 (both shown in FIG. 2). In some embodiments, the database 420 is stored remotely from the domain guard controller computer device 410. In some embodiments, the database 420 is decentralized. In the example embodiment, a person can access the database 420 via a high-trust domain computer device 425 by logging onto domain guard controller computer device 410.

Figure 5:
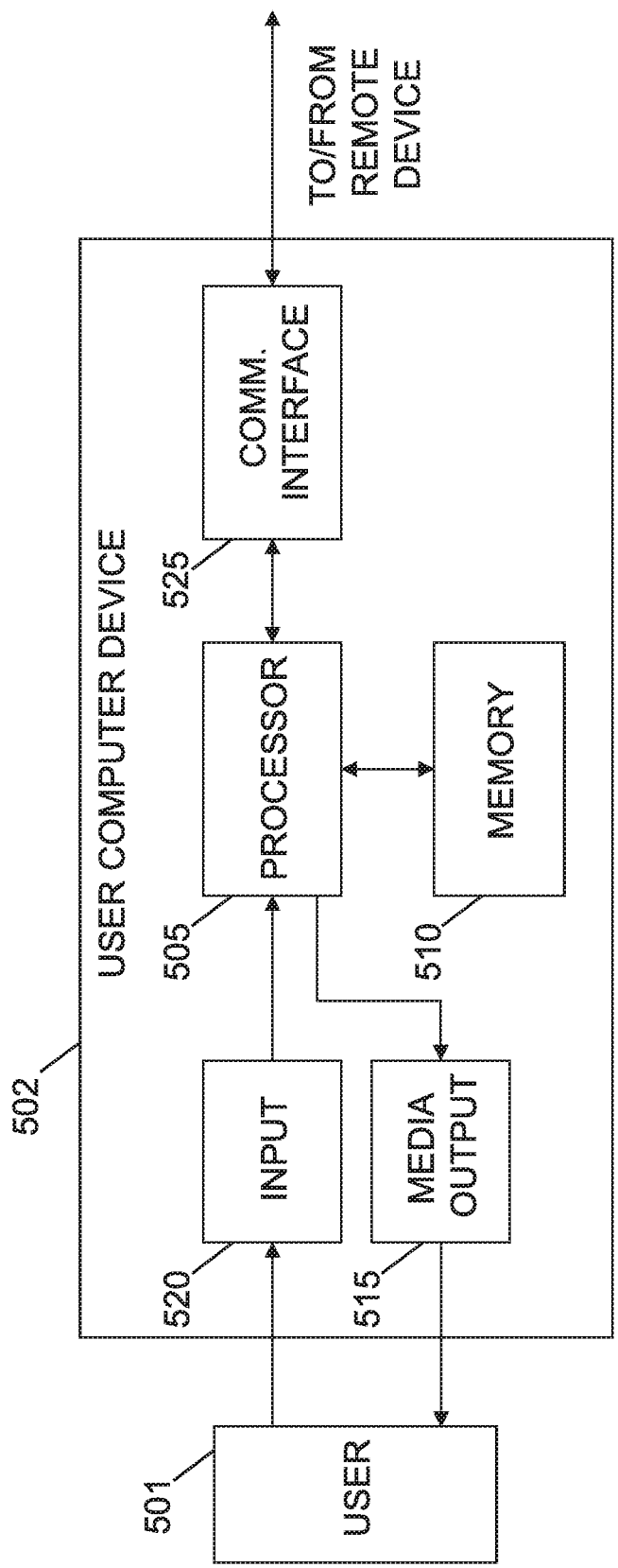
FIG. 5 illustrates an example configuration of a client computer device shown in FIG. 4, in accordance with one embodiment of the present disclosure.

FIG. 5 illustrates an example configuration of a client computer device, in accordance with one embodiment of the present disclosure. User computer device 502 is operated by a user 501. The user computer device 502 may include, but is not limited to, inflight entertainment/passenger connectivity system 115, cabin services subsystems 120, other aircraft systems 125 (all shown in FIG. 1), low-trust domain computer device 405, and high-trust domain computer device 425 (both shown in FIG. 4). The user computer device 502 includes a processor 505 for executing instructions. In some embodiments, executable instructions are stored in a memory area 510. The processor 505 may include one or more processing units (e.g., in a multi-core configuration). The memory area 510 is any device allowing information such as executable instructions and/or transaction data to be stored and retrieved. The memory area 510 may include one or more computer-readable media.

The user computer device 502 also includes at least one media output component 515 for presenting information to the user 501. The media output component 515 is any component capable of conveying information to the user 501. In some embodiments, the media output component 515 includes an output adapter (not shown) such as a video adapter and/or an audio adapter. An output adapter is operatively coupled to the processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, the media output component 515 is configured to present a graphical user interface (e.g., a web browser and/or a client application) to the user 501. A graphical user interface may include, for example, an interface for viewing entertainment. In some embodiments, the user computer device 502 includes an input device 520 for receiving input from the user 501. The user 501 may use the input device 520 to, without limitation, select an entertainment to view. The input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 515 and the input device 520.

The user computer device 502 may also include a communication interface 525, communicatively coupled to a remote device such as the domain guard controller computer device 410 (shown in FIG. 4). The communication interface 525 may include, for example, a wired or wireless network adapter and/or a wireless data transceiver for use with a mobile telecommunications network.

Stored in the memory area 510 are, for example, computer-readable instructions for providing a user interface to the user 501 via the media output component 515 and, optionally, receiving and processing input from the input device 520. A user interface may include, among other possibilities, a web browser and/or a client application. Web browsers enable users, such as the user 501, to display and interact with media and other information typically embedded on a web page or a website from the domain guard controller computer device 410. A client application allows the user 501 to interact with, for example, the domain guard controller computer device 410. For example, instructions may be stored by a cloud service, and the output of the execution of the instructions sent to the media output component 515.

The processor 505 executes computer-executable instructions for implementing aspects of the disclosure. In some embodiments, the processor 505 is transformed into a special purpose microprocessor by executing computer-executable instructions or by otherwise being programmed.

Figure 6:
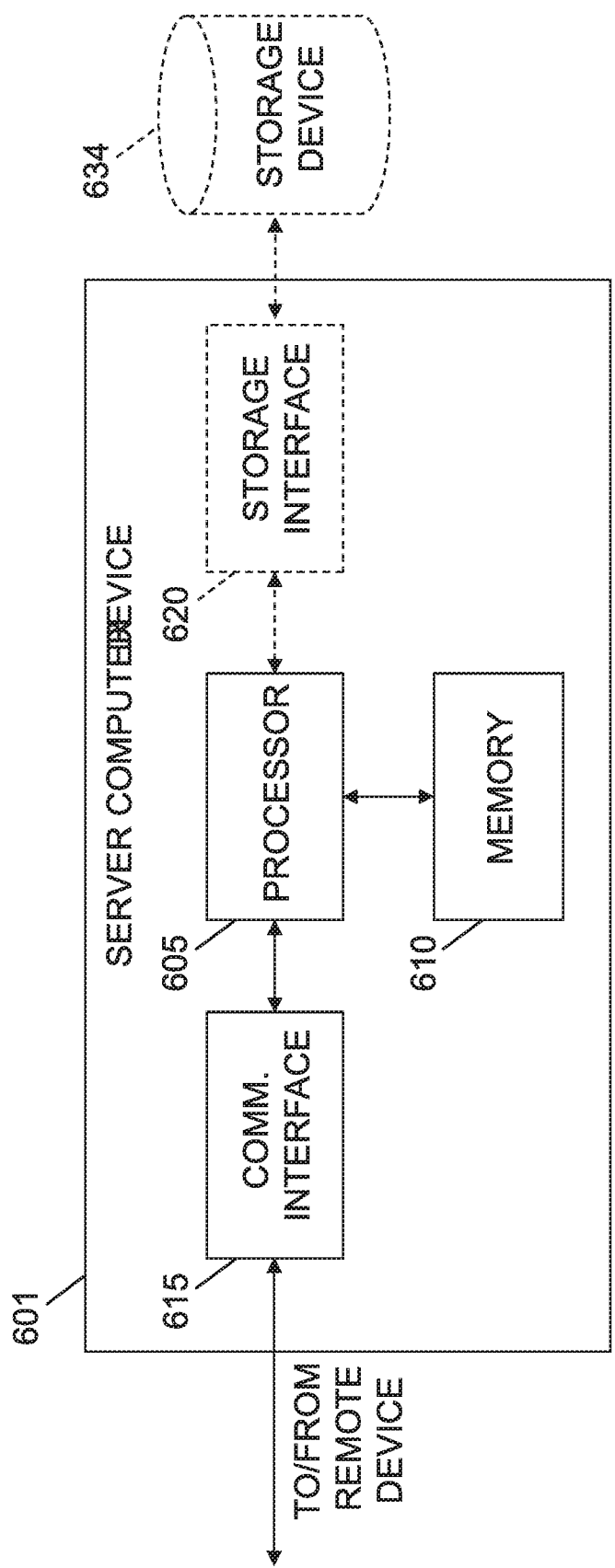
FIG. 6 illustrates an example configuration of the server system shown in FIG. 4, in accordance with one embodiment of the present disclosure.

FIG. 6 illustrates an example configuration of the domain guard controller computer device 410 (shown in FIG. 4), in accordance with one embodiment of the present disclosure. Server computer device 601 may include, but is not limited to, the inflight entertainment/passenger connectivity system 115, cabin services subsystems 120, other aircraft systems 125, cabin services system controller 150 (all shown in FIG. 1), domain guard controller 205 (shown in FIG. 2), low-trust domain computer device 405, domain guard controller computer device 410, database server 415, and high-trust domain computer device 425 (all shown in FIG. 4). The server computer device 601 also includes a processor 605 for executing instructions. Instructions may be stored in a memory area 610. The processor 605 may include one or more processing units (e.g., in a multi-core configuration).

The processor 605 is operatively coupled to a communication interface 615 such that the server computer device 601 is capable of communicating with a remote device such as another server computer device 601, another domain guard controller computer device 410, low-trust domain computer device 405, or high-trust domain computer device 425. For example, the communication interface 615 may receive requests from the low-trust domain computer device 405 or the high-trust domain computer device 425, as illustrated in FIG. 4.

The processor 605 may also be operatively coupled to a storage device 634. The storage device 634 is any computer-operated hardware suitable for storing and/or retrieving data, such as, but not limited to, data associated with the database 420 (shown in FIG. 4). In some embodiments, the storage device 634 is integrated in the server computer device 601. For example, the server computer device 601 may include one or more hard disk drives as the storage device 634. In other embodiments, the storage device 634 is external to the server computer device 601 and may be accessed by a plurality of server computer devices 601. For example, the storage device 634 may include a storage area network (SAN), a network attached storage (NAS) system, and/or multiple storage units such as hard disks and/or solid state disks in a redundant array of inexpensive disks (RAID) configuration.

In some embodiments, the processor 605 is operatively coupled to the storage device 634 via a storage interface 620. The storage interface 620 is any component capable of providing the processor 605 with access to the storage device 634. The storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 605 with access to the storage device 634.

The processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with instructions as shown in process 300.

The methods and system described herein may be implemented using computer programming or engineering techniques including computer software, firmware, hardware, or any combination or subset. As disclosed above, at least one technical problem with prior systems is that there is a need for systems for an efficient and effective manner of protecting high-trust systems and networks. The system and methods described herein address that technical problem. Additionally, at least one of the technical solutions provided by this system to overcome technical problems may include: (i) allowing for the fast and efficient transfer of information; (ii) allowing for increased security without requiring additional hardware; (iii) allowing for secure messages that are analyzed quickly; and (iv) providing proper domain separation.

The methods and systems described herein may be implemented using computer programming or engineering techniques including computer software, firmware, hardware, or any combination or subset thereof, wherein the technical effects may be achieved by performing at least one of the following steps: (a) receive a packet from a low-trust domain to be transmitted to a high-trust domain, wherein the packet includes a message and a source address; (b) compare, by a first processor, the source address to a white list of source addresses; (c) if the source address matches the white list, remove, by the first processor, the message from the packet; (d) compare, by the first processor, the message to one or more stored messaging requirements; (e) if the message meets the one or more stored messaging requirements, write, by the first processor, the message to a memory; (f) read, by the second processor, the message from the memory; (g) compare, by the second processor the message to a plurality of stored values; (h) if the message matches the plurality of stored values, act, by the second processor, upon the message; (i) generate a new packet including the message to transmit to its destination in the high-trust domain; (j) execute a first hypervisor associated with the low-trust domain, wherein the first hypervisor includes the first processor, the memory, and a first database including the white list and the one or more messaging requirements; (k) execute a second hypervisor associated with the high-trust domain, wherein the second hypervisor includes the second processor and a second database including the plurality of stored values; and (l) discard, by one of the first processor and the second processor the message and log the event, if the message fails a comparison The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer device for routing communications from a low-trust domain to a high-trust domain, the computer device comprising at least a first processor and a second processor, wherein the first processor is programmed to:
  receive a packet from the low-trust domain to be transmitted to the high-trust domain, wherein the packet includes a message and a source address;
  compare the source address to a white list of source addresses;
  if the source address matches the white list, compare the message to one or more messaging requirements; and
  if the message meets the one or more messaging requirements, write the message to a memory;
  wherein the second processor is programmed to:
    read the message from the memory;
    compare the message to a plurality of stored values; and
    if the message matches the plurality of stored values, act upon the message.

2. The computer device of claim 1, wherein the first processor is further programmed to remove the message from the packet.

3. The computer device of claim 1, wherein the second processor is further programmed to transmit the message to its destination.

4. The computer device of claim 3, wherein the second processor is further programmed to generate a new packet including the message to transmit to its destination in the high-trust domain.

5. The computer device of claim 1, wherein the first processor is in a first hypervisor associated with the low-trust domain, and wherein the second processor is in a second hypervisor associated with the high-trust domain.

6. The computer device of claim 5, wherein the memory is in the first hypervisor.

7. The computer device of claim 5, further comprising:
  a first database including the white list and the one or more messaging requirements, wherein the first database is in the first hypervisor; and
  a second database including the plurality of stored values, wherein the second database is in the second hypervisor.

8. The computer device of claim 1, wherein the first processor and the second processor are further programmed to, if the message fails a comparison, discard the message and log an event.

9. The computer device of claim 1, wherein the memory is read-only to the second processor.

10. The computer device of claim 1, further comprising a direct wired connection to at least one computer device of the low-trust domain.

11. A method for routing communications from a low-trust domain to a high-trust domain, the method implemented by a first processor and a second processor, the method comprising:
  receiving, by the first processor, a packet from the low-trust domain to be transmitted to the high-trust domain, wherein the packet includes a message and a source address;
  comparing, by the first processor, the source address to a white list of source addresses;
  if the source address matches the white list, comparing, by the first processor, the message to one or more messaging requirements;
  if the message meets the one or more messaging requirements, writing, by the first processor, the message to a memory;
  reading, by the second processor, the message from the memory;
  comparing, by the second processor, the message to a plurality of stored values; and
  if the message matches the plurality of stored values, acting, by the second processor, upon the message.

12. The method of claim 11, further comprising removing, by the first processor, the message from the packet.

13. The method of claim 11, further comprising
  generating a new packet including the message; and
  transmitting the message to its destination in the high-trust domain.

14. The method of claim 11, wherein the first processor is in a first hypervisor associated with the low-trust domain, wherein the first hypervisor includes the memory and a first database including the white list and the one or more messaging requirements, wherein the second processor is in a second hypervisor associated with the high-trust domain, and wherein the second hypervisor includes a second database including the plurality of stored values.

15. The method of claim 11, further comprising:
  discarding, by at least one of the first processor or the second processor, the message and logging an event, if the message fails a comparison.

16. A system for routing communications from a low-trust domain to a high-trust domain, the system comprising:
  a plurality of computer devices associated with a low-trust domain;
  at least one computer device associated with a high-trust domain; and
  a domain guard computer device comprising a first processor, a second processor, and at least one memory device, wherein the domain guard computer device is in communication with the plurality of computer devices associated with the low-trust domain and the at least one computer device associated with the high-trust domain, and wherein the domain guard computer device is programmed to:
    receive a packet from a computer device of the plurality of computer devices associated with the low-trust domain to be transmitted to the at least one computer device associated with the high-trust domain, wherein the packet includes a message and a source address;
    compare, by the first processor, the source address to a white list of source addresses, wherein the white list of source addresses includes addresses for the plurality of computer devices associated with the low-trust domain;
    if the source address matches the white list, compare, by the first processor, the message to one or more stored messaging requirements;
    if the message meets the one or more stored messaging requirements, write, by the first processor, the message to a memory;
    read, by the second processor, the message from the memory;
    compare, by the second processor, the message to a plurality of stored values; and
    if the message matches the plurality of stored values, act, by the second processor, upon the message.

17. The system of claim 16, wherein the domain guard computer device is further programmed to discard, by one of the first processor or the second processor, the message and log an event, if the message fails a comparison.

18. The system of claim 16, further comprising a direct wired connection from the domain guard computer device to at least one computer device of the plurality of computer devices associated with the low-trust domain.

19. The system of claim 16, wherein the domain guard computer device is further programmed to generate a new packet including the message to transmit to its destination in the high-trust domain.

20. The system of claim 16, wherein the domain guard computer device is further programmed to:
- execute a first hypervisor associated with the low-trust domain, wherein the first hypervisor includes the first processor, the memory, and a first database including the white list and the one or more messaging requirements; and
- execute a second hypervisor associated with the high-trust domain, wherein the second hypervisor includes the second processor and a second database including the plurality of stored values.

* * * * *